US007632481B2

(12) United States Patent
Khabashesku et al.

(10) Patent No.: US 7,632,481 B2
(45) Date of Patent: Dec. 15, 2009

(54) SIDEWALL FUNCTIONALIZATION OF NANOTUBES WITH HYDROXYL TERMINATED MOIETIES

(75) Inventors: Valery N. Khabashesku, Houston, TX (US); Lei Zhang, Houston, TX (US); John L. Margrave, Bellaire, TX (US); Mary Lou Margrave, legal representative, Bellaire, TX (US)

(73) Assignee: William Marsh Rice University, Houston, TX (US)

( * ) Notice: Subject to any disclaimer, the term of this patent is extended or adjusted under 35 U.S.C. 154(b) by 567 days.

(21) Appl. No.: 10/560,351

(22) PCT Filed: Jun. 16, 2004

(86) PCT No.: PCT/US2004/019015

§ 371 (c)(1),
(2), (4) Date: Jun. 7, 2006

(87) PCT Pub. No.: WO2005/028740

PCT Pub. Date: Mar. 31, 2005

(65) Prior Publication Data

US 2007/0189387 A1 Aug. 16, 2007

Related U.S. Application Data

(60) Provisional application No. 60/478,936, filed on Jun. 16, 2003, provisional application No. 60/490,556, filed on Jul. 28, 2003.

(51) Int. Cl.
*B82B 3/00* (2006.01)
*D01F 9/12* (2006.01)
*D06M 13/11* (2006.01)

(52) U.S. Cl. .................. 423/447.1; 423/447.2; 977/748; 977/847

(58) Field of Classification Search .................. 423/447; 977/743, 745, 847
See application file for complete search history.

(56) References Cited

U.S. PATENT DOCUMENTS 5,374,415 A  12/1994  Alig et al.

(Continued)

FOREIGN PATENT DOCUMENTS

WO  WO 9618059 A1 * 6/1996

OTHER PUBLICATIONS

Iijima, S., "Helical microtubules of graphitic carbon", Nature, 1991, 354, 56-58.

(Continued)

*Primary Examiner*—Wayne Langel
*Assistant Examiner*—Syed Iqbal
(74) *Attorney, Agent, or Firm*—Winstead PC

(57) ABSTRACT

The present invention is directed to methods of forming sidewall-functionalized carbon nanotubes, wherein such functionalized carbon nanotubes have hydroxyl-terminated moieties covalently attached to their sidewalls. Generally, such methods involve chemistry on carbon nanotubes that have first been fluorinated. In some embodiments, fluorinated carbon nanotubes ("fluoronanotubes") are reacted with mono-metal salts of a dialcohol, MO—R—OH, where M is a metal and R is hydrocarbon or other organic chain and/or ring structural unit. In such embodiments, —O—R—OH displaces —F on the nanotube, the fluorine leaving as MF. Generally, such mono-metal salts are formed in situ by the addition of MOH to one or more dialcohols in which the fluoronanotubes have been dispersed. In some embodiments, fluoronanotubes are reacted with amino alcohols, such as being of the type $H_2N$—R—OH, wherein —N(H)—R—OH displaces —F on the nanotube, the fluorine leaving as HF.

36 Claims, 12 Drawing Sheets

U.S. PATENT DOCUMENTS

2006/0171874 A1    8/2006    Khabashesku et al.

OTHER PUBLICATIONS

Iijima, S. et al., "Single-shell carbon nanotubes of 1-nm diameter", Nature, 1993, 363, 603-605.

Bethune, D. S. et al., "Cobalt-catalysed growth of carbon nanotubes with single-atomic-layer walls", Nature, 1993, 363, 605-607.

Khabashesku, V. N. et al., "Chemistry of Carbon Nanotubes", Encyclopedia of Nanoscience and Nanotechnology, Ed. S. Nalwa, American Scientific Publishers, 2004, vol. 1, 849-861.

Khabashesku, V. N. et al., "Fluorination of Single-Wall Carbon Nanotubes and Subsequent Derivatization Reactions", Acc. Chem. Res., 2002, 35, 1087-1095.

Bahr, J. L. et al., "Covalent chemistry of single-wall carbon nanotubes", J. Mater. Chem., 2002, 12, 1952-1958.

Barrera, E. V., "Key Methods for Developing Single-Wall Nanotube Composites", JOM, 2000, 52, 38-42.

Zhu, J. et al., "Improving the Dispersion and Integration of Single-Walled Carbon Nanotubes in Epoxy Composites through Functionalization", Nano Lett, 2003, 3 No. 8, 1107-1113.

Zhu, J. et al., "Reinforcing Epoxy Polymer Composites Through Covalent Integration of Functionalized Nanotubes", Adv. Funct. Mater., 2004, 14, No. 7, 643-648.

Pantarotto, D. et al., "Synthesis, Structural Characterization, and Immunological Properties of Carbon Nanotubes Functionalized...", J. Am. Chem. Soc., 2003, 125, 6160-6164.

Ebbesen, T. W., "Carbon Nanotubes", Annu. Rev. Mater. Sci., 1994, 24, 235-264.

Thess, A. et al., "Crystalline Ropes of Metallic Carbon Nanotubes", Science, 1996, 273, 483-487.

Vander Wal, R. L. et al., "Flame synthesis of Fe catalyzed single-walled carbon nanotubes and Ni catalyzed nanofibers: growth...", Chem. Phys. Lett., 2001, 349, 178-184.

Hafner, J. H. et al., "Catalytic growth of single-wall carbon nanotubes from metal particles", Chem. Phys. Lett., 1998, 296, 195-202.

Cheng, H. M. et al., "Bulk morphology and diameter distribution of single-walled carbon nanotubes synthesized by catalytic...", Chem. Phys. Lett., 1998, 289, 602-610.

Nikolaev, P. et al., "Gas-phase catalytic growth of single-walled carbon nanotubes from carbon monoxide", Chem. Phys. Lett., 1999, 313, 91-97.

O'Connell, M. J. et al., "Band Gap Fluorescence from Individual Single-Walled Carbon Nanotubes", Science, 2002, 297, 593-596.

Bachilo, S. M. et al., "Structure-Assigned Optical Spectra of Single-Walled Carbon Nanotubes", Science, 2002, 298, 2361-2366.

Strano, M. S. et al., "Electronic Structure Control of Single-Walled Carbon Nanotube Functionalization", Science, 2003, 301, 1519-1522.

Chiang, I. W. et al., "Purification and Characterization of Single-Wall Carbon Nanotubes", J. Phys. Chem. B, 2001, 105, 1157-1161.

Chiang, I. W. et al., "Purification and Characterization of Single-Wall Carbon Nanotubes (SWNTs) Obtained from the Gas-Phase...", J. Phys. Chem. B, 2001, 105, 8297-8301.

Liu, J. et al., "Fullerene Pipes", Science, 1998, 280, 1253-1256.

Gu, Z. et al., "Cutting Single-Wall Carbon Nanotubes through Fluorination", Nano Lett., 2002, 2, No. 9, 1009-1013.

Kudin, K. N. et al., "Fluorinated single-wall carbon nanotubes", Phys. Rev. B, 2001, 63, 45413.

Mickelson, E. T., "Novel Chemistry of Elemental Carbon: Graphite, Fullerenes and Nanotubes", Ph. D. Thesis, Rice University, Houston, Texas, 1999.

Mickelson, E. T. et al., "Solvation of Fluorinated Single-Wall Carbon Nanotubes in Alcohol Solvents", J. Phys. Chem. B, 1999, 103, 4318-4322.

Stevens, J. L. et al., "Sidewall Amino-Functionalization of Single-Walled Carbon Nanotubes through Fluorination and Subsequent...", Nano Lett., 2003, 3, No. 3, 331-336.

Mickelson, E. T. et al., "Fluorination of single-wall carbon nanotubes", Chem. Phys. Lett., 1998, 296, 188-194.

Peng, H. et al., "Sidewall functionalization of single-walled carbon nanotubes with organic peroxides", Chem. Comm., 2003, 362-363.

Peng, H. et al., "Sidewall Carboxylic Acid Functionalization of Single-Walled Carbon Nanotubes", J. Am. Chem. Soc., 2003, 125, 15174-15182.

Stevens et al., "Sidewall Functionalization of Single-Walled Carbon Nanotubes Through C-N Bond...", Proc. NanoTech, 2003, vol. 3, 169-172.

* cited by examiner

US 7,632,481 B2

SIDEWALL FUNCTIONALIZATION OF NANOTUBES WITH HYDROXYL TERMINATED MOIETIES

CROSS REFERENCE TO RELATED APPLICATIONS

This Application claims priority to U.S. Provisional Patent Application Ser. Nos. 60/478,936 and 60/490,556, filed Jun. 16, 2003 and Jul. 28, 2003, respectively. The present Application is related to commonly-assigned Patent Application filed concurrently herewith, entitled, "Fabrication of Carbon Nanotube Reinforced Epoxy Polymer Composites Using Functionalized Carbon Nanotubes," and incorporated by reference herein.

This invention was made with support from the Robert A. Welch Foundation, Grant Number C-0109; and the Texas Higher Education Coordinating Board, ATP Grant Number 003604-0026-2001.

FIELD OF THE INVENTION

The present invention relates generally to carbon nanotubes, and specifically to methods of functionalizing carbon nanotubes with hydroxyl-terminated moieties.

BACKGROUND

Carbon nanotubes (CNTs), comprising multiple concentric shells and termed multi-wall carbon nanotubes (MWNTs), were discovered by Iijima in 1991 [Iijima, S. *Nature* 1991, 354, 56]. Subsequent to this discovery, single-wall carbon nanotubes (SWNTs), comprising a single graphene rolled up on itself, were synthesized in an arc-discharge process using carbon electrodes doped with transition metals [Iijima, S.; Ichihashi, T. *Nature* 1993, 363, 603; and Bethune, D. S., Kiang, C. H.; de Vries, M. S.; Gorman, G.; Savoy, R.; Vasquez, J; Beyers, R. *Nature* 1993, 363, 605]. These carbon nanotubes (especially SWNTs) posses unique mechanical, electrical, and thermal properties, and such properties make them attractive for a wide variety of applications.

Chemical manipulation of single-wall carbon nanotubes (SWNT), especially sidewall functionalization, has recently become an area of escalated fundamental and technological interest. Both covalent and noncovalent sidewall chemistry of SWNTs have been reported, including direct fluorination and subsequent derivatization, addition of radicals, carbenes and nitrenes as well as the 1,3-dipolar and electrophilic additions, and modification through van der Waals interactions with aromatic molecules or polymers. See Khabashesku, V. N.; Margrave, J. L. "Chemistry of Carbon Nanotubes" in *Encyclopedia of Nanoscience and Nanotechnology*, Ed. S. Nalwa, American Scientific Publishers, 2004, Volume 1, pp. 849-861, and references therein; Khabashesku, V. N.; Billups, W. E.; Margrave, J. L. *Acc. Chem. Res.*, 2002, 35, 1087; Bahr, J. L.; Tour, J. M. *J. Mater. Chem.* 2002, 12, 1952. The applications of functionalized SWNTs as reinforcers for fabrication of covalently integrated polymer composites [Barrera, E. V. *JOM*, 2000, 52, 38; Zhu, J.: Kim, J.; Peng, H.; Margrave, J. L.; Khabashesku, V. N.; Barrera, E. V. *Nano Lett.* 2003, 3, 1107; Zhu, J.; Peng, H.; Rodriguez-Macias, F.; Margrave, J. L.; Khabashesku, V. N.; Imam, M. A.; Lozano, K.; Barrera, E. V. *Adv. Funct. Mater*, 2003, in press] and as vehicles for targeted drug delivery have recently been demonstrated. See Pantarotto, D.; Partidos, C. D.; Graff, R.; Hoebeke, J.; Briand, J.-P.; Prato, M.; Bianco, A. *J. Am. Chem. Soc.* 2003, 125, 6160. These studies have confirmed the need for derivatization of the SWNTs with the organic functional groups which can provide a high binding affinity and selectivity through covalent or hydrogen bond formation. They also suggest that for improving the processing, particularly in biomedical applications, the covalent sidewall functionalization with moieties terminated with hydrophilic substituents, such as hydroxyl groups, should be of primary importance.

Recent experimental studies [Khabashesku, V. N.; Billups, W. E.; Margrave, J. L. *Acc. Chem. Res.*, 2002, 35, 1087] have shown that fluoronanotubes prepared by direct fluorination of SWNTs can be used as a versatile precursors for preparation of sidewall functionalized nanotube derivatives through a nucleophilic substitution of fluorine. A simple method for introducing hydroxyl functionalities to CNTs, and especially SWNTs, utilizing fluorinated carbon nanotubes as intermediates, would be very advantageous, particularly for situations requiring the dispersal of carbon nanotubes in polar solvents.

SUMMARY

The present invention is directed to methods of forming sidewall-functionalized carbon nanotubes, wherein such functionalized carbon nanotubes have hydroxyl-terminated moieties covalently attached to their sidewalls. Generally, such methods involve chemistry on carbon nanotubes that have first been fluorinated.

In some embodiments, fluorinated carbon nanotubes ("fluoronanotubes") are reacted with mono-metal salts of a dialcohol, MO—R—OH, where M is a metal and R is hydrocarbon or other organic chain and/or ring structural unit. In such embodiments, —O—R—OH displaces —F on the nanotube, the fluorine leaving as MF. Generally, such mono-metal salts are formed in situ by the addition of MOH to one or more dialcohols in which the fluoronotubes have been dispersed.

In some embodiments, fluoronanotubes are reacted with amino alcohols, such as being of the type $H_2N$—R—OH, wherein —N(H)—R—OH displaces —F on the nanotube, the fluorine leaving as HF.

In some embodiments, variations of the above-described chemistries are employed in which thiol groups, —SH, replace one or both of the —OH groups in the dialcohols, and/or the —OH group in the amino alcohol.

Applications for such nanotubes functionalized with hydroxyl-terminated moieties are far reaching, but many will undoubtedly capitalize on their enhanced dispersability and/or solubility in polar solvents and further functionalization that can be carried out with the terminal hydroxyl group. As an example, the hydroxyl-terminated moieties on the carbon nanotubes can be reacted with epichlorohydrin to yield carbon nanotubes with epoxide groups attached to their sidewalls. These epoxide-functionalized carbon nanotubes can be mixed with epoxy resins and cured with an appropriate curing agent to form carbon nanotube-epoxy composites.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
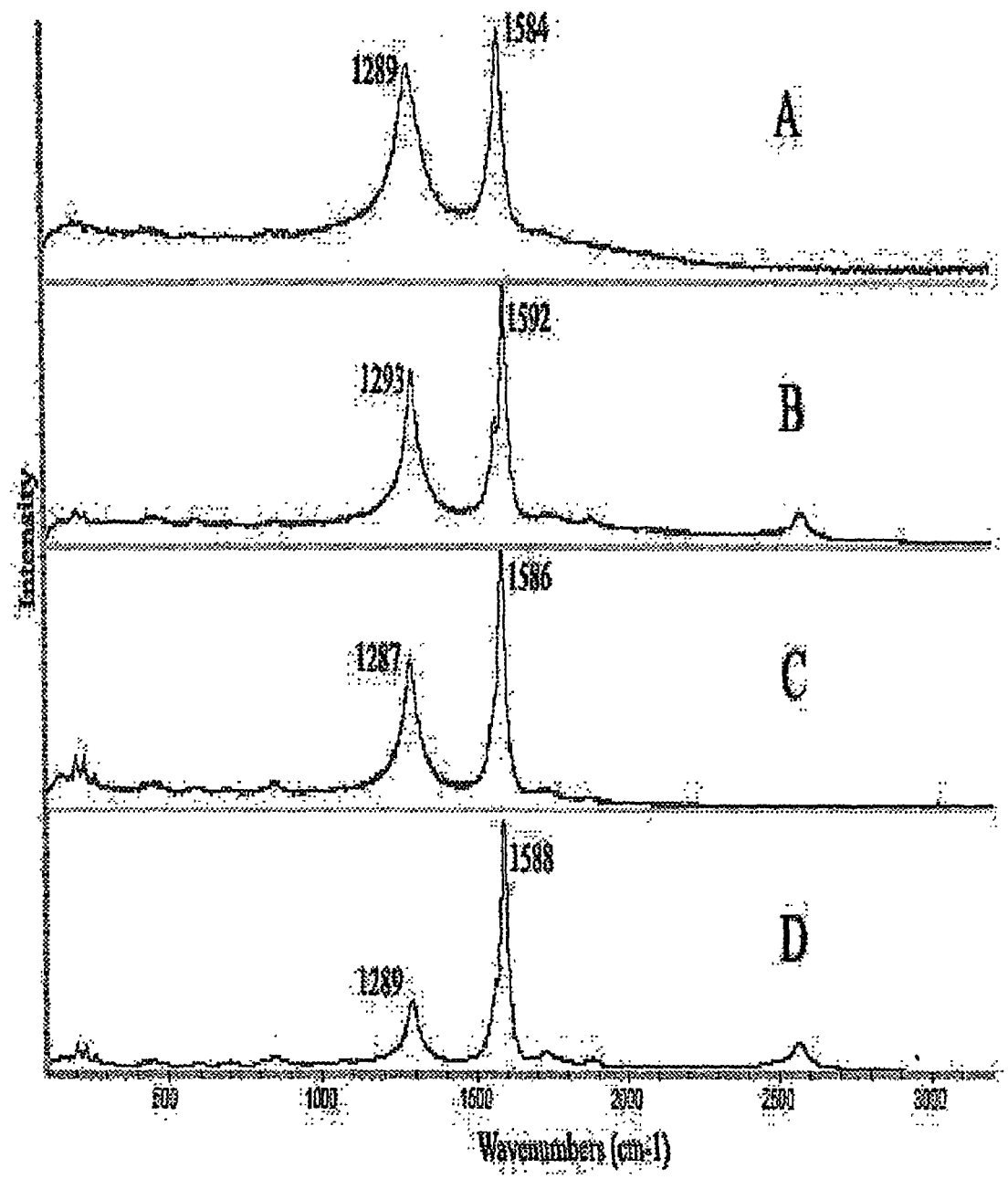
FIG. 1 depicts Raman spectra of SWNT materials: fluoronanotube 1 (A), hydroxyl-nanotubes 3a (B), 3b (C), and residue after TGA of 3b.

The present invention is directed to methods of forming sidewall-functionalized carbon nanotubes, wherein such functionalized carbon nanotubes have hydroxyl-terminated moieties covalently attached to their sidewalls ("hydroxyl-nanotubes"), and to the compositions and articles of manufacture made by such methods. Generally, such methods involve chemistry on carbon nanotubes that have first been fluorinated. While the making and/or using of various embodiments of the present invention are discussed below, it should be appreciated that the present invention provides many applicable inventive concepts that may be embodied in a variety of specific contexts. The specific embodiments discussed herein are merely illustrative of specific ways to make and/or use the invention and are not intended to delimit the scope of the invention.

Carbon nanotubes (CNTs), according to the present invention, include, but are not limited to, single-wall carbon nanotubes (SWNTs), multi-wall carbon nanotubes (MWNTs), double-wall carbon nanotubes, buckytubes, fullerene tubes, tubular fullerenes, graphite fibrils, and combinations thereof. Such carbon nanotubes can be made by any known technique including, but not limited to, arc discharge [Ebbesen, *Annu. Rev. Mater. Sci.* 1994, 24, 235-264], laser oven [Thess et al., *Science* 1996, 273, 483-487], flame synthesis [Vander Wal et al., *Chem. Phys. Lett.* 2001, 349, 178-184], chemical vapor deposition [U.S. Pat. No. 5,374,415], wherein a supported [Hafner et al., *Chem. Phys. Lett.* 1998, 296, 195-202] or an unsupported [Cheng et al., *Chem. Phys. Lett.* 1998, 289, 602-610; Nikolaev et al., *Chem. Phys. Lett.* 1999, 313, 91-97] metal catalyst may also be used, and combinations thereof. Depending on the embodiment, the CNTs can be subjected to one or more processing steps prior to fluorinating them or subjecting them to any of the chemistries of the present invention. In some embodiments, the CNTs are separated based on a property selected from the group consisting of chirality, electrical conductivity, thermal conductivity, diameter, length, number of walls, and combinations thereof. See O'Connell et al., *Science* 2002, 297, 593-596; Bachilo et al., *Science* 2002, 298, 2361-2366; Strano et al., *Science* 2003, 301, 1519-1522. In some embodiments, the CNTs have been purified. Exemplary purification techniques include, but are not limited to, those by Chiang et al. [Chiang et al., *J. Phys. Chem. B* 2001, 105, 1157-1161; Chiang et al., *J. Phys. Chem. B* 2001, 105, 8297-8301]. In some embodiments, the CNTs have been cut by a cutting process. See Liu et al., *Science* 1998, 280, 1253-1256; Gu et al., *Nano Lett.* 2002, 2(9), 1009-1013. The terms "CNT" and "nanotube" are used synonymously herein.

In some embodiments, fluorinated carbon nanotubes ("fluoronanotubes"), generally comprising a stoichiometry of about $C_1F_{0.01}$ to about $C_1F_1$, are reacted with mono-metal salts of a dialcohol, MO—R—OH, where M is a metal and R is hydrocarbon (e.g., —$(CH_2)_n$—) or other organic chain and/or ring structural unit. In such embodiments, —O—R—OH displaces —F on the nanotube, the fluorine leaving as MF. Generally, such mono-metal salts are formed in situ by the addition of MOH to one or more dialcohols in which the fluoronotubes have been dispersed.

The above-described reactions generally require a reaction duration that ranges from about 0.5 hours to about 3 hours. In some embodiments, the reaction is heated with a heating means. In some embodiments, ultrasonication is used to disperse the nanotubes and/or facilitate the reaction. In some embodiments, the reaction is homogenized or mixed using a homogenizing means. Suitable homogenizing means include, but are not limited to, mechanical stirring.

The dialcohols can be any dialcohol in which fluoronanotubes can be dispersed, and with which the fluoronanotubes will react under appropriate conditions. Some exemplary chemical routes utilizing exemplary dialcohols are shown in Scheme 1 A, wherein fluoronanotube 1 reacts with a mono-metal salt of a dialcohol generated by reacting any of dialcohols 2a-e with MOH, where M equals any of Li, Na, or K, to yield any of functionalized products 3a-e. Other exemplary dialcohols include bis-phenol A.

The above chemistry can be extended to multi-alcohols as well, as shown in Scheme 1 B, wherein fluoronanotube 1 reacts with a mono-metal salt of a multi-alcohol $R(OH)_n$ generated by reacting multi-alcohols 2f with MOH, where M equals any of Li, Na, or K, to yield functionalized products 3f. Thus, the above description can be extended to reacting fluoronanotubes with any mono-metal salt of the general formula $MOR(OH)_{n-1}$. Again, R is any hydrocarbon or other organic chain and/or ring structural unit that can serve as a backbone for the functionalizing moieties.

Scheme 1

(A)

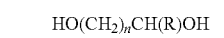

2a R = H, n = 1
b R = H, n = 2
c R = H, n = 3
d R = CH$_3$, n = 1
e R = CH$_2$CH$_3$, n = 1

MOH

-continued

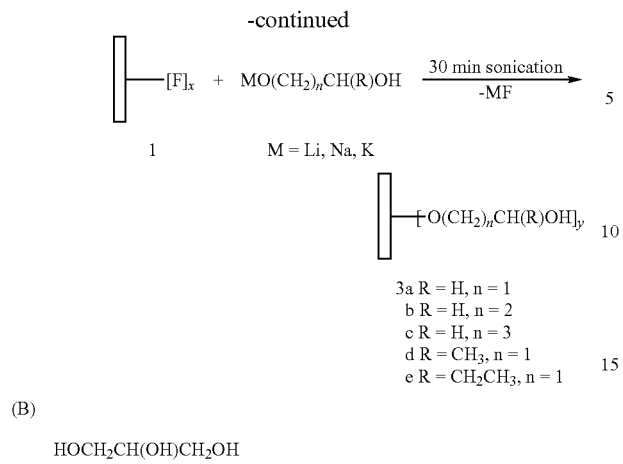

3a R = H, n = 1
 b R = H, n = 2
 c R = H, n = 3
 d R = CH₃, n = 1
 e R = CH₂CH₃, n = 1

(B)

HOCH₂CH(OH)CH₂OH

2f ↘ MOH

[F]ₓ + MOCH₂CH(OH)CH₂OH  →(30 min sonication / -MF)→  [OCH₂CH(OH)CH₂OH]ᵧ

1  M = Li, Na, K

3f

In some embodiments, the fluoronanotubes are first dispersed in a di- or multi-alcohol to form a dispersion. A metal hydroxide is then dissolved in the same or different di- or multi-alcohol to form a solution, after which the solution and the dispersion are combined to form a mixture. As above, ultrasonication may be employed to facilitate the dispersion formation and/or the mixing step.

In some embodiments, fluoronanotubes are reacted with amino alcohols, such as being of the type H₂N—R—OH, wherein —N(H)—R—OH displaces —F on the nanotube, the fluorine leaving as HF. Generally, in such embodiments, fluoronanotubes are dispersed in an appropriate amino alcohol to form a reaction mixture; a pyridine catalyst is added to the reaction mixture; and the reaction mixture+catalyst is allowed to react to form functionalized carbon nanotubes with amino (amine) terminated moieties. In some embodiments, ultrasonication is used to facilitate dispersion of the fluoronanotubes and/or induce mixing. In these or other embodiments, alternative mixing operations may be employed. Reactions generally take place for a duration that ranges from about 1 hour to about 5 hours, and at a temperature that ranges from about 70° C. to about 150° C.

The amino alcohols can be any amino alcohol in which fluoronanotubes can be dispersed, and with which the fluoronanotubes will react under appropriate conditions. Some exemplary chemical routes utilizing exemplary amino alcohols are shown in Scheme 2, wherein fluoronanotube 1 reacts with amino alcohols 2 g-l to form functionalized carbon nanotubes 3 g-l with amino-terminated moieties attached to their sidewalls.

Scheme 2

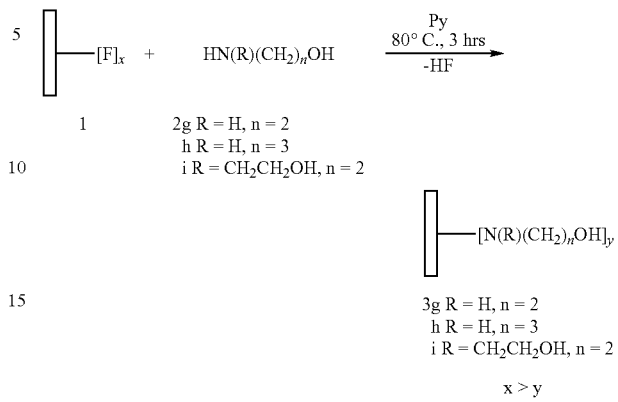

2g R = H, n = 2
 h R = H, n = 3
 i R = CH₂CH₂OH, n = 2

3g R = H, n = 2
 h R = H, n = 3
 i R = CH₂CH₂OH, n = 2 x > y

In some embodiments, the methods of the present invention are carried out, at least in part, in an inert atmosphere. Such inert atmospheres include, but are not limited to, Ar, Kr, He, Ne, N₂, CF₄, and combinations thereof.

The above-described methods yield hydroxy-nanotube products. In some embodiments, the hydroxy-nanotube products have a general formula CNT-[OR(OH)$_m$]$_x$, where R is a suitable organic backbone, m is at least one, and x is from about 1 to about 500 per 1,000 nanotube carbon atoms. In other embodiments, the hydroxy-nanotube products have a general formula CNT-[N(Y)R(OH)$_m$]$_x$, where R is a suitable organic backbone, Y is hydrogen or other organic species, m is at least one, and x is from about 1 to about 500 per 1,000 nanotube carbon atoms.

In some embodiments, variations of the above-described chemistries are employed in which thiol groups, —SH, replace one or both of the —OH groups in the dialcohols, and/or the —OH group in the amino alcohol.

While not intending to be bound by theory, recent DFT calculations [Kudin, K. N.; Bettinger, H. F.; Scuseria, G. E. *Phys. Rev. B,* 2001, 63, 45413] suggest that fluoronanotubes are better electron acceptors than the naked carbon nanotubes, and therefore might interact readily with strong nucleophilic reagents. These reactions are also facilitated by the weakened C—F bonds in fluoronanotubes (relative to alkyl fluorides), and therefore allowing fluorine to be more easily displaced. The solubility of fluoronanotubes in alcohols has prompted efforts to functionalize them by reactions with alkoxides. In a single example of this reaction documented prior to the present work, sonication of the fluoronanotubes (~C₂F) in methanol solution of sodium methoxide for 2 hrs was shown to produce the sidewall methoxylated SWNTs with the stoichiometry of C$_{4.4}$F(OCH₃)$_{0.25}$. Infrared spectroscopic and variable temperature-mass spectrometry (VTP-MS) data, as well as elevated oxygen content from electron microprobe analysis, confirmed the partial substitution of fluorine in fluoronanotubes and bonding of the methoxy groups to the nanotube sidewalls. See Mickelson, E. T. *Novel Chemistry of Elemental Carbon: Graphite, Fullerenes and Nanotubes,* Ph. D. Thesis, Rice University, Houston, Tex., 1999; Mickelson, E. T.; Chiang, I. W.; Zimmerman, J. L.; Boul, P. J.; Lozano, J.; Liu, J.; Smalley, R. E.; Hauge, R. H.; Margrave, J. L. *J. Phys. Chem. B,* 1999, 103, 4318. It is important to note, however, that sonication or refluxing of fluoronanotubes in alcohols (methanol, ethanol, iso-propanol, ethane diol and glycerol) alone does not result in any significant substitution or elimination of fluorine. See Shukla, R.; McClain, B.; Khabashesku, V. N.; Margrave, J. L. *Rice Quantum Institute 15th Annual Summer Research Colloquium*. Aug. 17, 2001, Abstr. p. 19. Therefore, alcohol species (i.e., diols and glycerol) can be used as both solvent media and as reagents to provide a surplus of hydroxyl terminated monoalkoxides through reactions with alkali bases (Scheme 1).

In previous work, it has been demonstrated that terminal diamines, e.g., $H_2N(CH_2)_nNH_2$ (n=2, 3, 4, 6), can dissolve fluoronanotubes, and, under elevated temperatures (90-150° C.), chemically react with them in the presence of catalytic amounts of pyridine. The reactions resulted in an almost complete removal and substitution of fluorine and produced amino group-terminated functionalized SWNTs by creating direct C—N bonding attachments to the sidewalls. See Stevens, J. L.; Kiny, V. U.; Huang, A. Y.; Chiang, I. W.; Derrien, G. A.; Khabashesku, V. N.; Margrave, J. L. *Proc. Nano Tech* 2003, Vol. 3, 169-172; Huang, A.Y.; Chiang, I. W.; Khabashesku, V. N.; Margrave, J. L. *Rice Quantum Institute 15th Annual Summer Research Colloquium*. Aug. 17, 2001, Abstr. p. 18; Stevens, J. L.; Huang, A.Y.; Peng, H.; Chiang, I. W.; Khabashesku, V. N.; Margrave, J. L. *NanoLett*. 2003, 3, 331; and Commonly-assigned U.S. patent application Ser. No. 10/714,187, filed Nov. 14, 2003.

Applications for such nanotubes functionalized with hydroxyl-terminated moieties are far reaching, but many will undoubtedly capitalize on their enhanced dispersability and/or solubility in polar solvents and further functionalization that can be carried out with the terminal hydroxyl group. As an example, the hydroxyl-terminated moieties on the carbon nanotubes can be reacted with epichlorohydrin to yield carbon nanotubes with epoxide groups attached to their sidewalls. These epoxide-functionalized carbon nanotubes can be mixed with epoxy resins and cured with an appropriate curing agent to form carbon nanotube-epoxy composites.

As described above, Applicants have developed convenient and efficient methods for sidewall functionalization of carbon nanotubes with —OH group-terminated moieties, dubbed "hydroxyl-nanotubes". These functional groups have been attached to the nanotube sidewalls through either C—O or C—N covalent bonds (where C is a carbon native to the nanotubes). Such methods are illustrated in Schemes 1 and 2 and utilize mild reaction conditions that can be readily followed. The applications of functionalized carbon nanotubes so prepared may be based on hydrogen bonding ability and chemical reactivity of terminal hydroxyl groups in the side chain. The chemistry of OH group is so abundant that the hydroxyl nanotubes can be used to produce covalently integrated nanotube-reinforced co-polymers and ceramics as well as biomaterials.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

Example 1

This Example serves to illustrate the types of materials that can be used and how a type of fluoronanotube can be prepared for use in some embodiments of the present invention. Note that while SWNTs were used in this Example, other types of CNTs could be used to make the fluoronanotubes.

In this Example, raw SWNTs, prepared at Rice University in the Carbon Nanotechnology Laboratory by the HiPco process, have been thoroughly purified to remove iron and other impurities as described previously. See Chiang, I. W.; Brinson, B. E.; Huang, A. Y; Willis, P. A.; Bronikowski, M. J.; Margrave, J. L.; Smalley, R. E.; Hauge, R. H. *J. Phys. Chem. B*, 2001, 105, 8297. After purification the iron content in the SWNTs did not exceed 1 wt. %. Purified SWNTs, such as that supplied by Carbon Nanotechnologies Inc., Houston, Tex., in a powder form, can also be used. The fluoronanotubes 1 of approximately $C_{2.5}F$ stoichiometry have been prepared, in this Example, by direct fluorination of purified SWNTs at 150° C. according to the procedure earlier reported by our groups. See Mickelson, E. T.; Huffman, C. B.; Rinzler, A. G.; Smalley, R. E.; Hauge, R. H.; Margrave, J. L. *Chem. Phys. Lett*. 1998, 296, 188. All other chemicals, such as alcohols 2a-f and amino alcohols 2g-i, used in further processing steps to produce hydroxyl-nanotubes, were purchased from Aldrich Chemical Co., Milwaukee, Wis.

Example 2

This Example serves to illustrate the synthetic procedures for methods of the present invention that correspond to Scheme 1.

For preparation of hydroxyl-nanotubes by this method (Scheme 1), 10-15 mg of fluoronanotubes 1 were placed in a vial with 10 ml of corresponding diols or triols 2a-f and sonicated (17 W/55 kHz Cole Palmer bath) for 30 min at 80-90° C. in order to achieve a complete dispersion. In a separate vial, 60-80 mg of LiOH (or NaOH or KOH) was sonicated for 30 min in 10 ml of corresponding alkanol until complete dissolution. In the case of diols 2a-h, this procedure was carried out at room temperature, while in the case of more viscous glycerol 2f, sonication at elevated temperature (80-90° C.) was necessary. In the next step, the solutions from both vials were combined and the resulting mixture sonicated for about 1 hour. The reaction mixture was then filtered through a 1-micron pore size Cole Palmer TEFLON membrane and washed with a large amount of ethanol and water to assure complete removal of LiF (or NaF or KF) and LiOH (or NaOH or KOH) byproducts. The precipitated product, adhering to the membrane as a black-colored film of hydroxyl-nanotubes 3a-f was peeled off and dried overnight in vacuum oven at 70° C. Energy dispersive analysis of X-rays (EDAX) elemental analyses showed 3-5 at. % residual fluorine content in the samples of 3a-f derivatives.

Example 3

This Example serves to illustrate the synthetic procedures for methods of the present invention that correspond to Scheme 2.

In this Example (Scheme 2) fluoronanotubes 1 (10-15 mg) were sonicated in 30 ml of amino alcohols 2g-i for 3 min. This resulted in complete dispersion of fluoronanotubes to form a black colored solution. Thereafter, five drops of pyridine (Py) were added to the solution as a catalyst and the reaction mixture was stirred under a nitrogen atmosphere for three hours at 80-90° C. The reaction mixture was then filtered through a 1-micron pore size Cole Palmer TEFLON membrane with a large amount of ethanol to assure complete removal of unreacted amino alcohol and undesired reaction byproducts. Functionalized SWNTs 3g-i were removed from the filter membrane and dried overnight in a vacuum oven at 70° C. EDAX analysis revealed residual fluorine content in 3*g-i* to be 11-13 at. %.

Example 4

This Example serves to illustrate how the product produced by the above-described methods can be characterized.

Raman; attenuated total reflectance-Fourier transform infrared (ATR-FTIR), and ultraviolet-visible-near infrared (UV-vis-NIR) spectroscopies, thermal gravimetric analysis/ differential thermal analysis (TGA/DTA), scanning electron microscopy/energy dispersive analysis of X-rays (SEM/ EDAX), atomic force microscopy (AFM) and transmission electron microscopy (TEM) methods were all used for characterization of pristine SWNTs, fluoronanotubes, and hydroxyl-nanotubes 3*a-i* prepared in Examples 2 and 3. The Raman spectra for the samples placed on the top of a standard microscope slide were collected with a Renishaw 1000 microraman system operating with an AlGaAs diode 780-nm laser source. For the ATR-FTIR spectral measurements, a Thermal Nicolet Nexus 870 FTIR system with an ATR accessory was employed. The spectra in the UV-vis-NIR range were taken using a Shimadzu 3101 PC UV/vis/NIR spectrometer. The thermal degradation analyses were performed with a TA-SDT-2960 TGA/DTA analyzer. Scanning electron microscopy (SEM) was performed at 30 kV beam energy using a Phillips XL-30 field emission microscope equipped with an energy dispersive X-ray (EDAX) analyzer. A Digital Instruments MultiMode scanning probe microscope (SPM) with a model 2570JV-Z scanner was used for tapping mode atomic force microscopy analysis (AFM). Transmission electron microscopy (TEM) photoimages of specimen placed on lacey carbon coated copper grids (size 200 mesh) were obtained with a JEOL JEM-2010 electron microscope operating at an accelerating voltage of 100 kV.

a. Optical Spectroscopy

Figure 2:
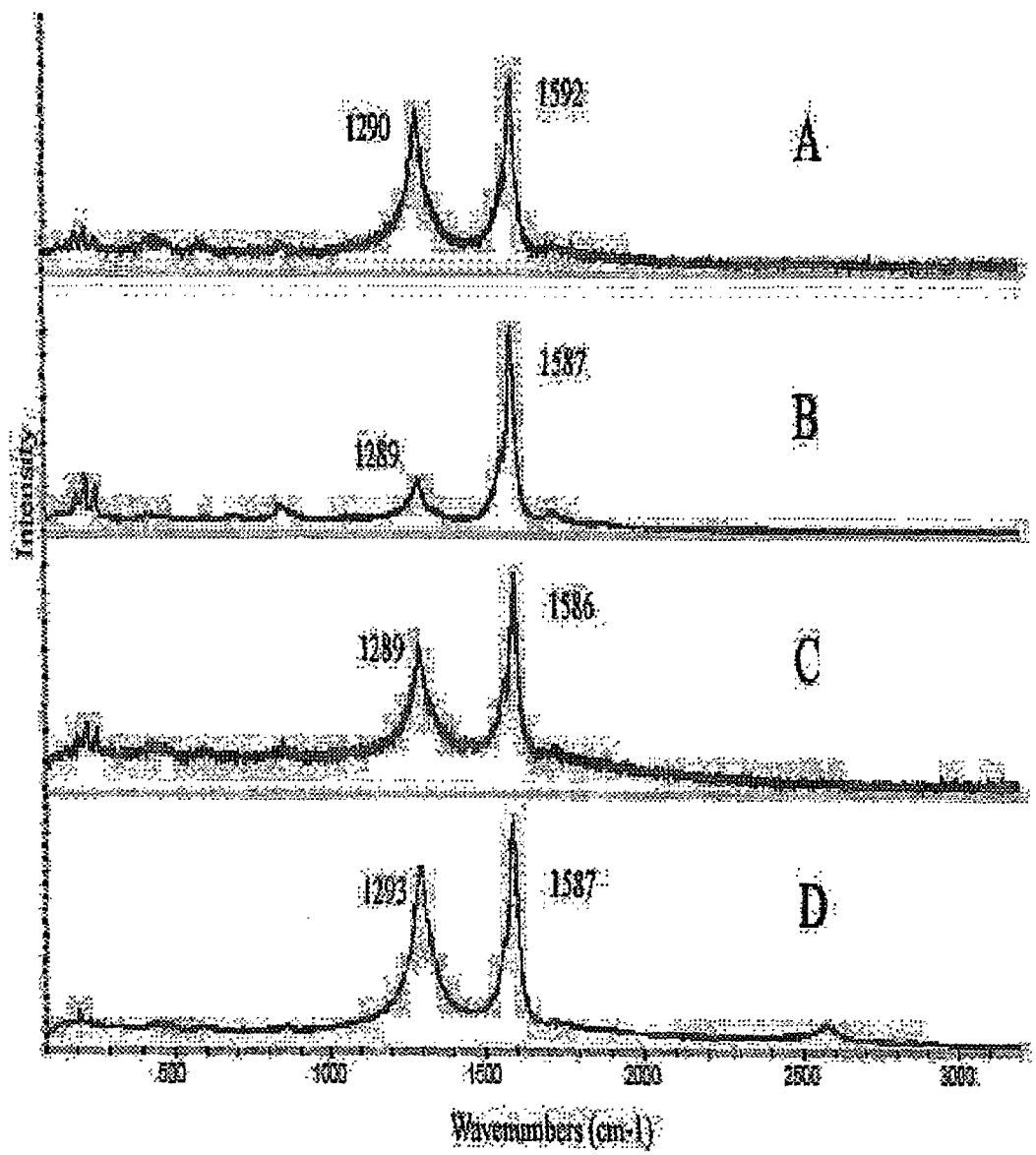
FIG. 2 depicts Raman spectra of hydroxyl-nanotubes: (A) 3c, (B) 3d, (C) 3e, (D) 3f.
Figure 3:
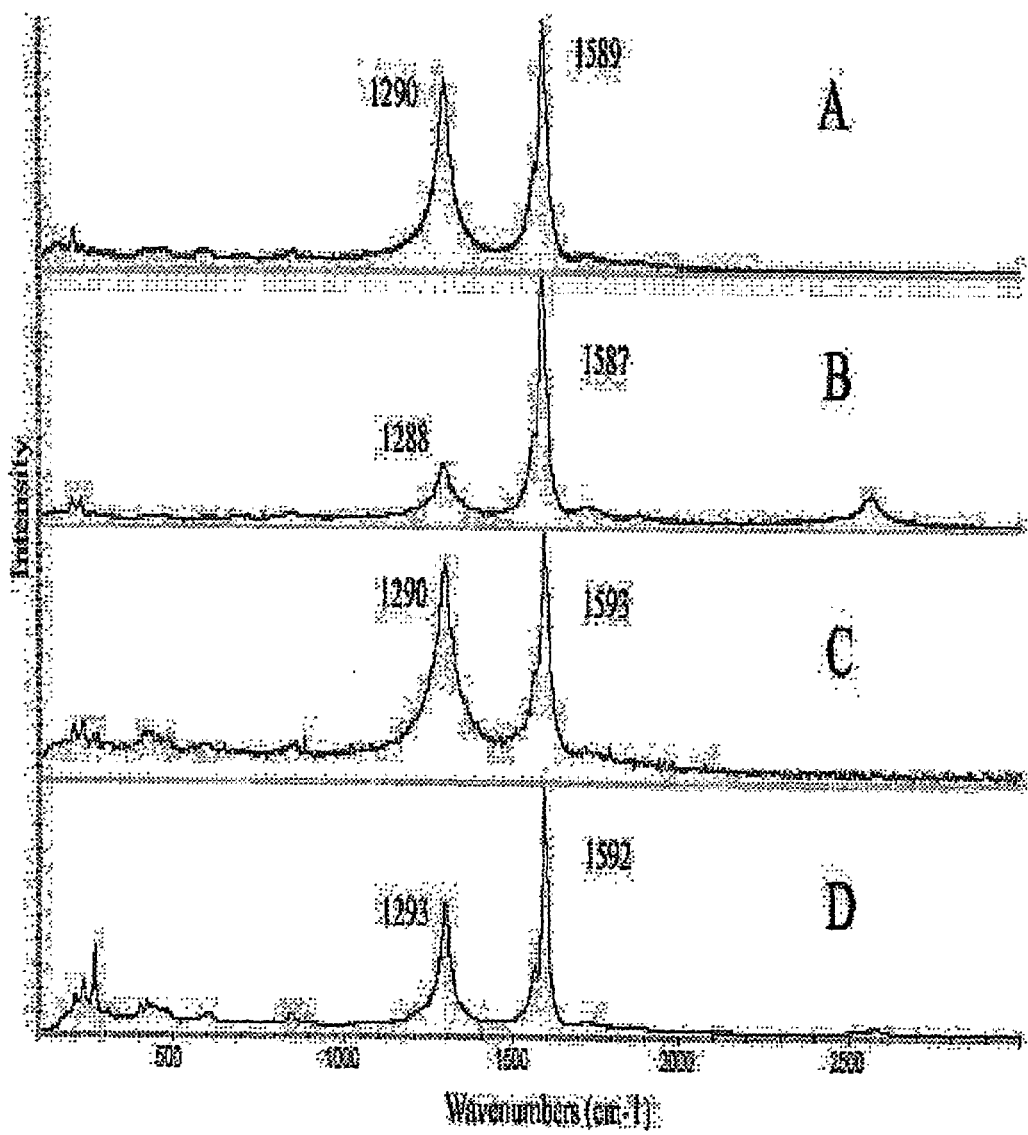
FIG. 3 depicts Raman spectra of SWNT materials: (A) 3g, (B) residue after TGA of 3g, (C) 3h, (D) 31.

Raman spectroscopy provides a quick evaluation of the covalent sidewall modification of the nanotubes. The Raman spectra collected for the SWNT derivatives of Examples 2 and 3 are shown on FIGS. 1-3. The observation of the peak in the 1285-1300 cm$^{-1}$ region has been related to the sp$^3$ states of carbon and is normally used as a proof of the disruption of the aromatic system of π-electrons on the nanotube sidewalls by the attached functional groups. In the Raman spectra of fluoronanotubes 1 (FIG. 1A) the observed high-intensity peak at 1293 cm$^{-1}$ reflects the largest content of sp$^3$-hybridized sidewall carbons (~40%) among all the functionalized SWNTs prepared in Examples 2 and 3. This high degree of sidewall modification in 1 causes the complete disappearance of the SWNT breathing mode peaks seen in pristine SWNTs at 200-260 cm$^{-1}$, as well as the broadening and weakening of the tangential mode peak which is red-shifted from 1594 cm$^{-1}$ in naked nanotubes to 1584 cm$^{-1}$ in 1. Observed in the Raman spectra of hydroxyl nanotubes 3*a-l*, the sp$^3$ carbon peaks in the range of 1287-1293 cm$^{-1}$ thus indicate covalent functionalization. Lower relative intensity of these peaks compared to Raman spectrum of fluoronanotubes 1 can be explained by the ongoing (along with fluorine substitution) sidewall elimination of fluorine from 1 in the reactions studied (Schemes 1,2) which reduces the number of sp$^3$ carbon states and partially restores the sp$^2$-bonding on the nanotube sidewall. Unlike 1, the breathing mode peaks at 200-260 cm$^{-1}$ become visible in the spectra of 3*a-i* and exhibit higher intensities for SWNT derivatives 3*a* and 3*d*, functionalized at a lowest degree (FIGS. 1B and 2F). This mode become weaker in derivatives 3*b,c,e-i* that possess more sidewall-attached groups—which very likely hinder the radial breathing oscillation of the nanotube. See Khabashesku, V. N.; Margrave, J. L. *Chemistry of Carbon Nanotubes in Encyclopedia of Nanoscience and Nanotechnology*, Ed. S. Nalwa, American Scientific Publishers, 2004, Vol. 1, pp. 849-861, and references therein; Khabashesku, V. N.; Billups, W. E.; Margrave, J. L. *Acc. Chem. Res.*, 2002, 35, 1087; Bahr, J. L.; Tour, J. M. *J. Mater. Chem.* 2002, 12, 1952.

Figure 4:
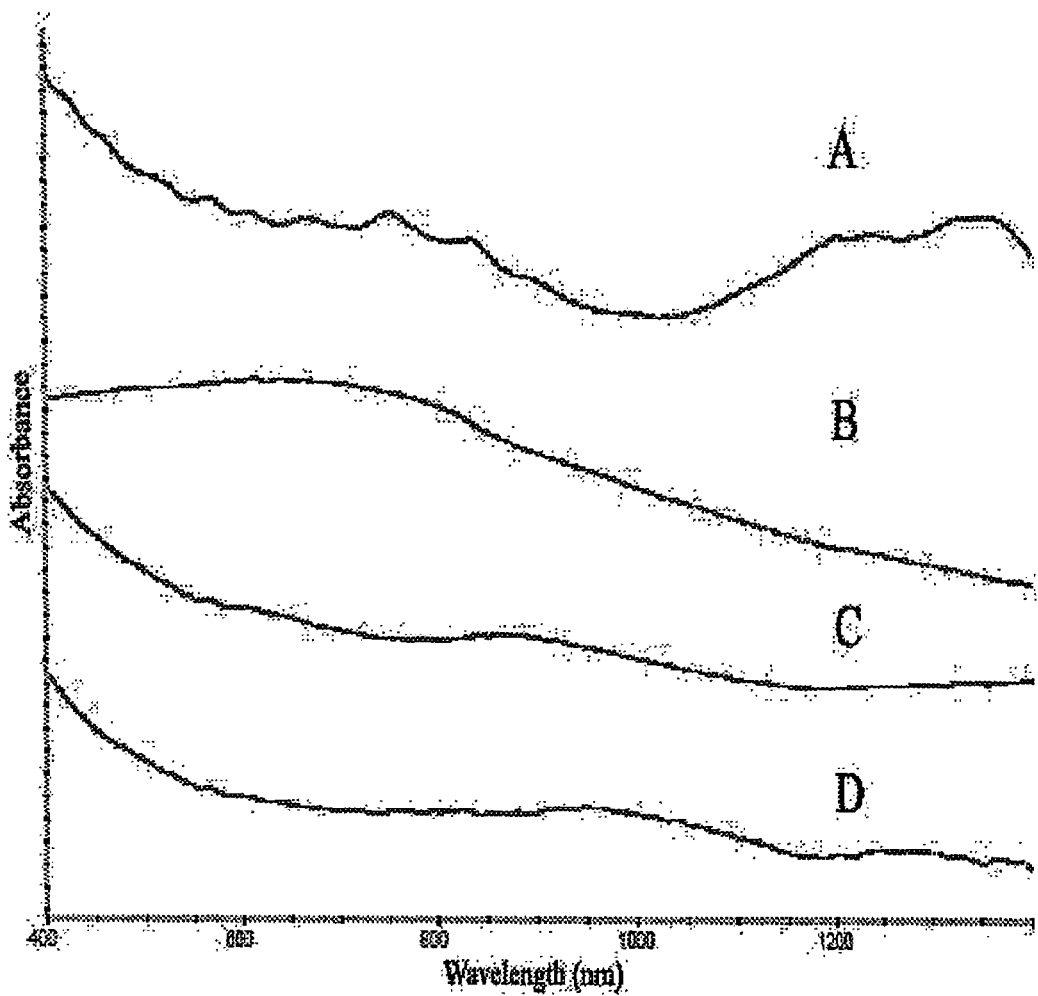
FIG. 4 depicts UV-vis-NIR spectra of pristine SWNTs (A), fluoronanotubes 1 (B), and hydroxyl-nanotubes 3f (C) and 3g (D)

UV-vis-NIR spectroscopy serves as another spectroscopic probing of the SWNT sidewall functionalization. In this case, an altering of the electronic structure leads to loss of the van Hove transition features routinely observed in the spectra of pristine nanotubes. In the present Example, this argument is illustrated by comparing in FIG. 4 the UV-vis-NIR spectra of pristine SWNT with those taken for fluoronanotube 1 and hydroxyl-nanotubes 3*f,g* in dimethylformamide (DMF) solution. Unlike with naked (e.g., pristine) SWNTs, van Hove singularities are completely absent in the spectrum of the highly functionalized derivative 1. Dramatic reduction in the intensities of van Hove singularities observed for 3*f,g* made their UV-vis-NIR spectra appear typical for sidewall functionalized SWNTs, thus providing important evidence for the occurrence of chemical modification. See Khabashesku, V. N.; Margrave, J. L. *Chemistry of Carbon Nanotubes in Encyclopedia of Nanoscience and Nanotechnology*, Ed. S. Nalwa, American Scientific Publishers, 2004, Vol. 1, pp. 849-861, and references therein; Khabashesku, V. N.; Billups, W. E.; Margrave, J. L. *Acc. Chem. Res.*, 2002, 35, 1087; Bahr, J. L.; Tour, J. M. *J. Mater. Chem.* 2002, 12, 1952; Stevens, J. L.; Kiny, V. U.; Huang, A. Y.; Chiang, I. W.; Derrien, G. A.; Khabashesku, V. N.; Margrave, J. L. *Proc. NanoTech* 2003, Vol. 3, 169-172.

Figure 5:
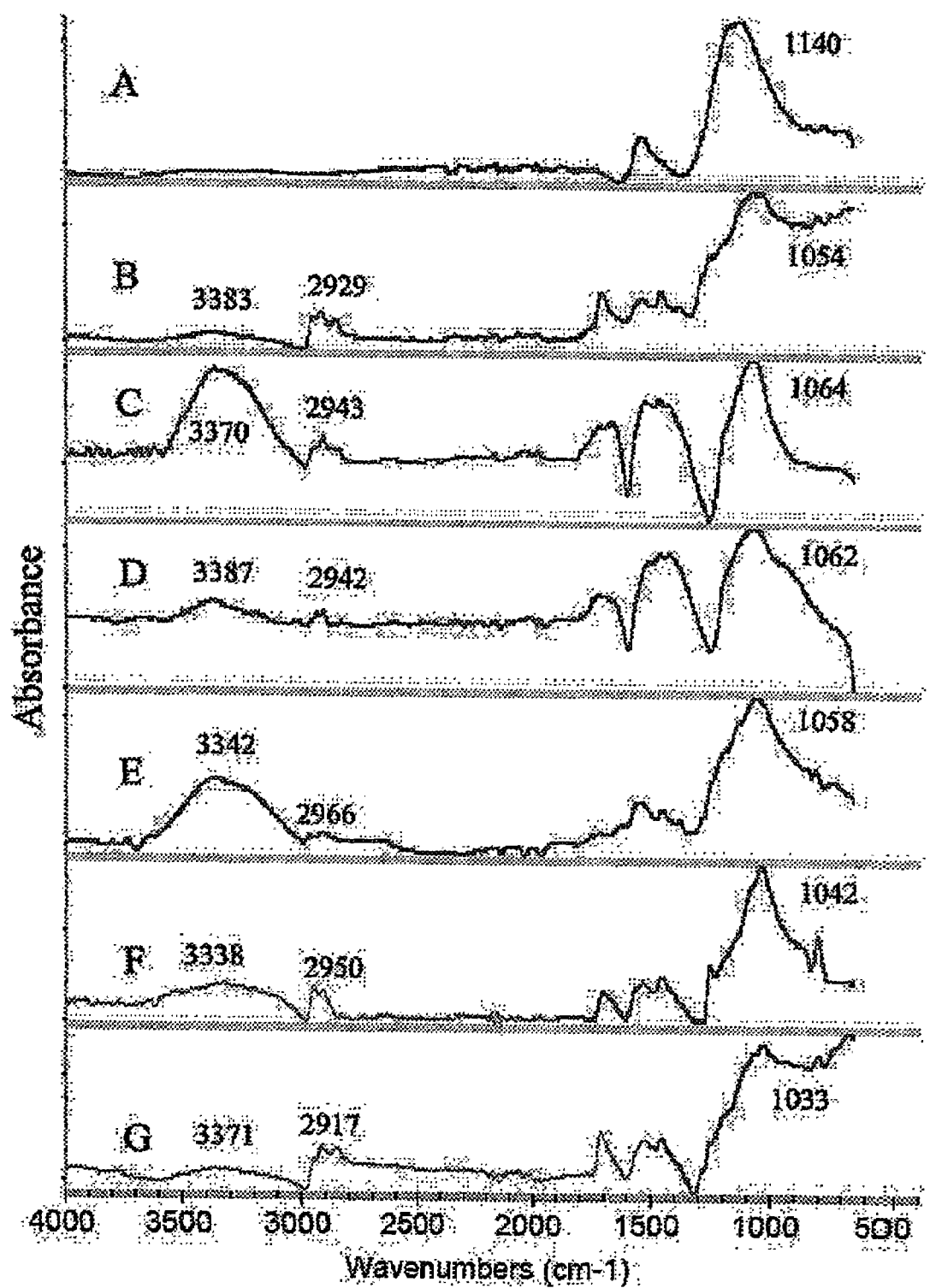
FIG. 5 depicts ATR-FTIR spectra of fluoronanotube 1 (A) and hydroxyl-nanotubes (B) 3a, (C) 3b, (D) 3c, (E) 3d, (F) 3e, (G) 3f.
Figure 6:
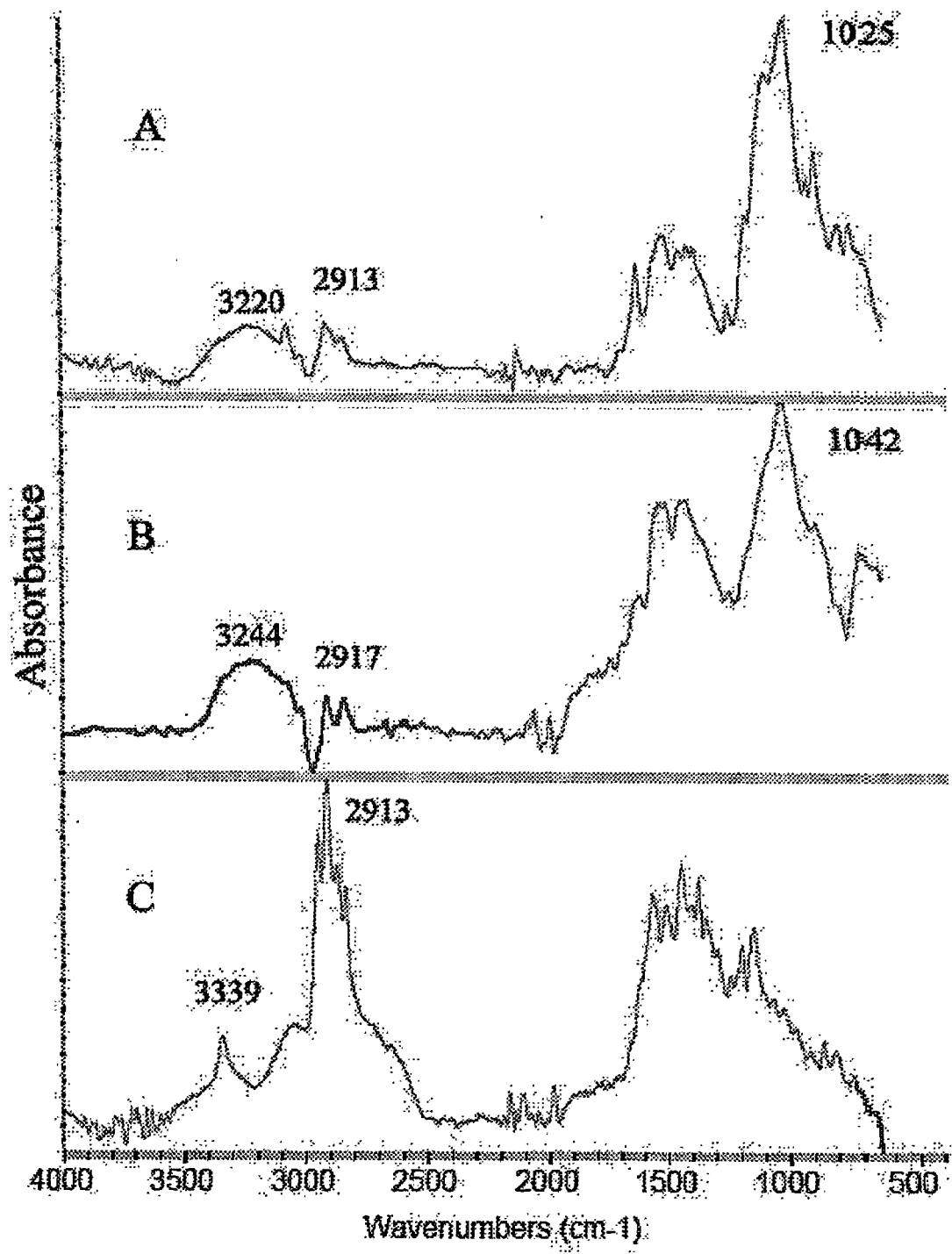
FIG. 6 depicts ATR-FTIR spectra of hydroxyl-nanotubes: (A) 3g, (B) 3h, (C) 31.

The ATR-FTIR spectra shown on FIGS. 5 and 6 were used to identify the hydroxyl group terminated moieties, covalently bonded to the sidewalls of the SWNTs. The strong peak around 1140 cm$^{-1}$, characteristic of the C—F bond stretches in the fluoronanotubes 1 (FIG. 5A), has disappeared after reactions with diols, triols, and amino alcohols. This peak was replaced in the spectra of hydroxyl-nanotubes 3*a-i* by peaks in the 1020-1070 cm$^{-1}$ region which are attributed to the C—O bond stretches of the nanotube-O—C and C—OH units. The new, very broad bands in the range of 3000-3600 cm$^{-1}$ are assigned to the O—H stretches, while the peaks in the 2800-3000 cm$^{-1}$ and 1360-1460 cm$^{-1}$ regions are assigned to the C—H stretching and deformation modes, respectively. The C—N stretching modes of the nanotube-N (H)—C or nanotube-N(C)—C structural units in derivatives 3*g,h* and 3*i*, were observed in the spectral range of 1120-1210 cm$^{-1}$ (FIGS. 6A-C), characteristic for the C—N modes in secondary and tertiary amines, respectively. See Lin-Vien, D.; Colthup, N. B.; Fatelley, W. G.; Grasselli, J. G. *The Handbook of Infrared and Raman Characteristic Frequencies of Organic Molecules*; Academic Press Inc.: San Diego, Calif., 1991, p. 299. The activated C=C stretching mode peaks in 1 and 3*a-i* were observed in the 1540-1580 cm$^{-1}$ region.

b. Thermal Degradation Studies

Figure 7:
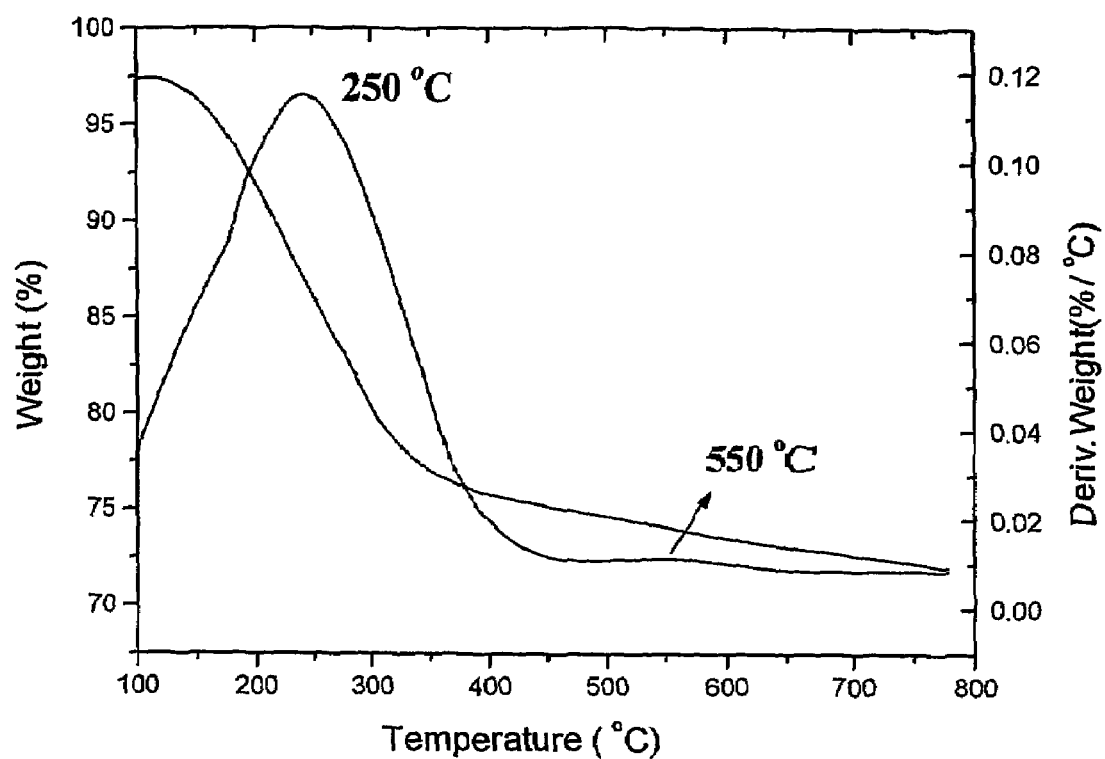
FIG. 7 depicts TGA-DTA of hydroxyl-nanotubes 3b.
Figure 8:
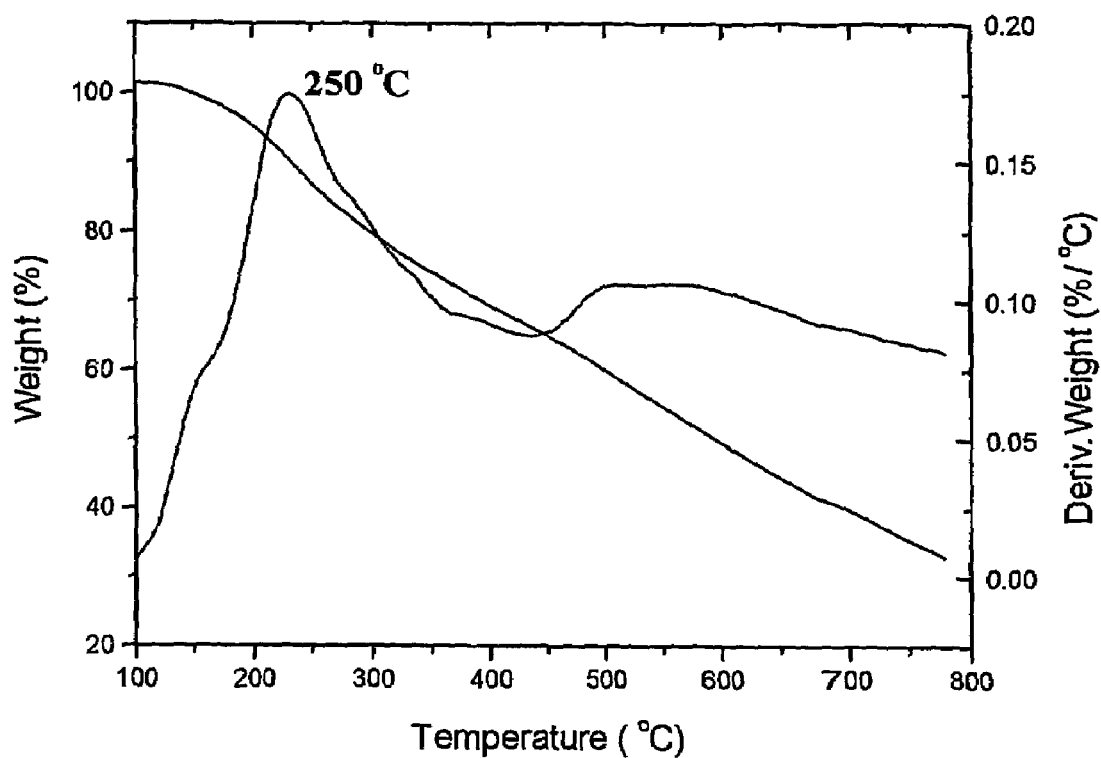
FIG. 8 depicts TGA-DTA of hydroxyl-nanotubes 3f.
Figure 9:
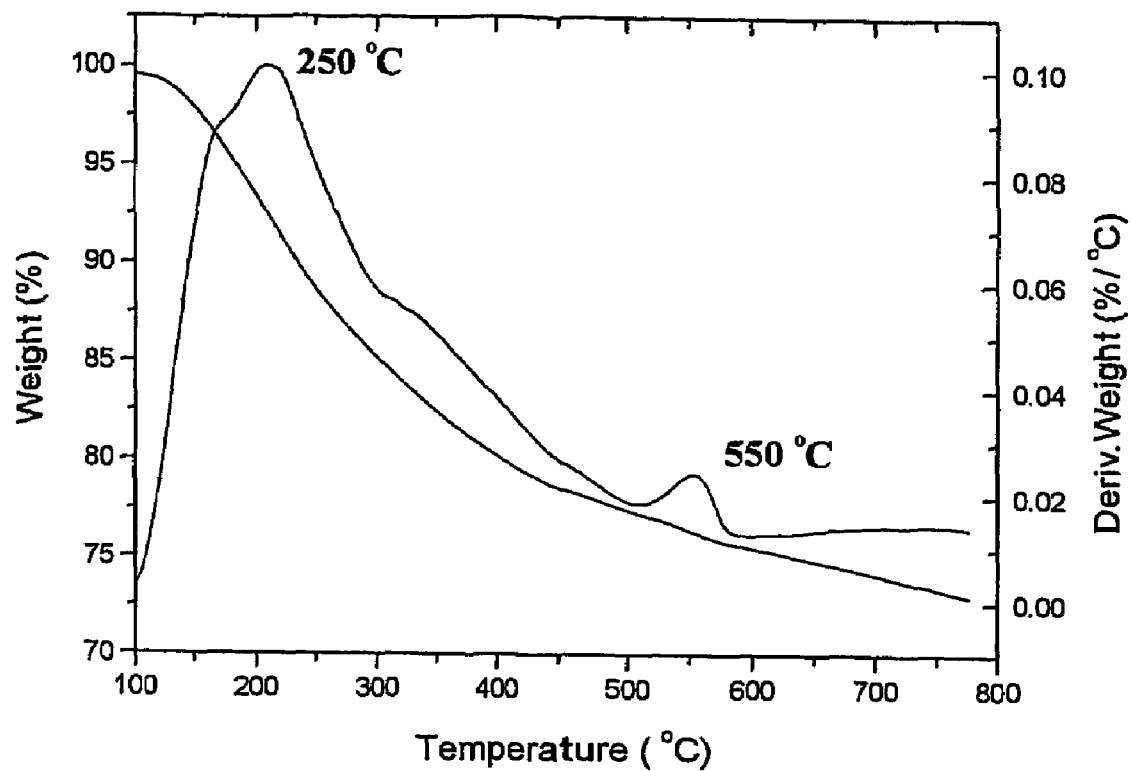
FIG. 9 depicts TGA-DTA of hydroxyl-nanotubes 3g.

These studies provided further evidence for covalent sidewall derivatization of nanotubes. The TGA-DTA data plots obtained for samples 3*b*, 3*f* and 3*g* (FIGS. 7-9) show on a derivative plots a major peak at 250° C. The appearance of these peaks at such high temperatures indicates that the weight loss is caused by detachment and fragmentation of OH group-terminated moieties and not by the desorption of physisorbed species from nanotubes. The second peak observed on DTA plots for these SWNT derivatives at about 550° C. is due to elimination of residual C—F bonds [Khabashesku, V. N.; Billups, W. E.; Margrave, J. L. *Acc. Chem. Res.*, 2002, 35, 1087; Mickelson, E. T. *Novel Chemistry of Elemental Carbon: Graphite, Fullerenes and Nanotubes*, Ph. D. Thesis, Rice University, Houston, Tex., 1999], correlating with the EDAX-measured residual fluorine content. The minor character of these peaks shows that the majority of the C—F bonds in fluoronanotubes 1 have been efficiently replaced by the OH group-terminated moieties in the course of the reactions (Schemes 1, 2). The major peaks observed at 250° C. on TGA plots of 3b, 3f, and 3g show average weight losses of 20%, 35%, and 22%, respectively. Assuming that this weight loss is due to elimination of OH group-terminated moieties, the degree of sidewall functionalization in these derivatives can roughly be estimated as $\frac{1}{25}$ in 3b, $\frac{1}{16}$ in 3f, and $\frac{1}{20}$ in 3g.

The Raman spectra (FIGS. 1D and 3B) taken for residue materials after TGA of 3b and 3g derivatives, and prepared by different methods (Schemes 1, 2), both show a dramatic reduction in the intensity of the $sp^3$ carbon mode. This data indicates that the detachment of functional groups from nanotube sidewalls occurs in agreement with the previous observations of thermal degradation in other covalently functionalized SWNTs. See Khabashesku, V. N.; Margrave, J. L. *Chemistry of Carbon Nanotubes in Encyclopedia of Nanoscience and Nanotechnology*, Ed. S. Nalwa, American Scientific Publishers, 2004, Vol. 1, pp. 849-861, and references therein; Khabashesku, V. N.; Billups, W. E.; Margrave, J. L. *Acc. Chem. Res.*, 2002, 35, 1087; Bahr, J. L.; Tour, J. M. *J. Mater. Chem.* 2002, 12, 1952; Stevens, J. L.; Huang, A. Y.; Peng, H.; Chiang, I. W.; Khabashesku, V. N.; Margrave, J. L. *NanoLett.* 2003, 3, 331; Peng, H.; Reverdy, P.; Khabashesku, V. N.; Margrave, J. L. *Chem. Comm.* 2003, 362; Peng, H.; Alemany, L. B.; Margrave, J. L.; Khabashesku, V. N. *J. Am. Chem. Soc.* 2003, 125, 15174-15182.

The volatile species evolving during thermal degradation of SWNT derivatives have been analyzed by variable temperature pyrolysis-mass spectrometry (VTP-MS). The data obtained by VTP-MS for 3a-f indicate a fragmentation of attached groups under vacuum conditions in the 300-550° C. temperature range, detected in mass spectra by peaks at m/z 44 ($C_2H_4O$), 29 (HCO) in 3a and 3d-f, and additional groups of peaks at m/z 58, 57, 56, 55 ($C_3H_6O$ through $C_3H_2O$) and m/z 72, 71, 70 ($C_4H_8O$ to $C_4H_6O$) in 3b and 3c, respectively. The presence of sidewall C—N bonded groups in the derivative 3i causes the appearance of a major peak at m/z 105 due to detachment of diethanol amine at temperatures in the 250-400° C. range.

c. Microscopy Analysis

Figure 10:
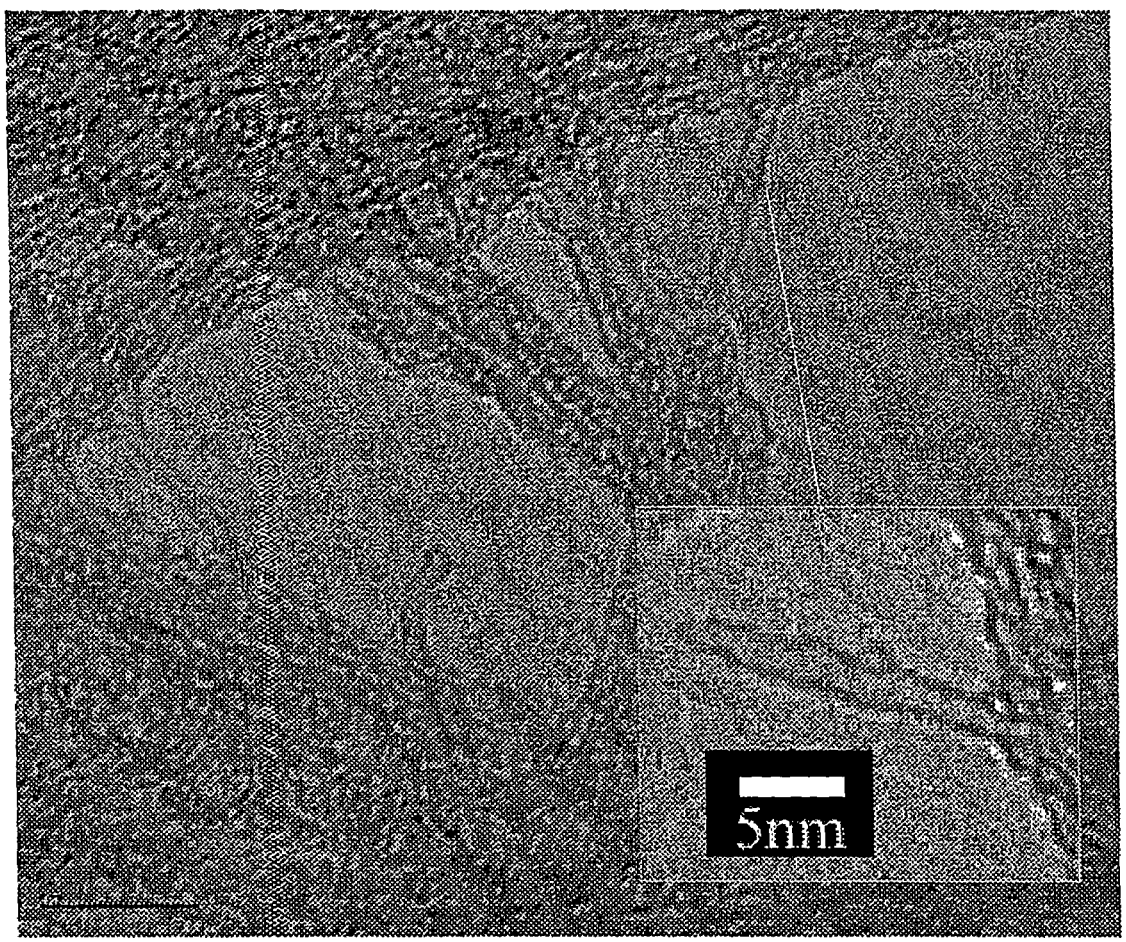
FIG. 10 depicts a TEM image of a specimen of hydroxyl-nanotubes 3f wherein the inset depicts a zoomed-in image of a single functionalized nanotube.

TEM allowed direct imaging of sidewall modification in the hydroxyl nanotubes. FIG. 10 shows a TEM image of glycerol functionalized SWNT 3f specimen placed on lacey carbon-coated copper grid. The inset clearly shows a "bumpy" surface of a single nanotube resulting from covalent alteration of the fraction of carbon-carbon bonds on the sidewall from shorter $sp^2$ to a longer $sp^3$ state carbon formed linkages.

Figure 11:
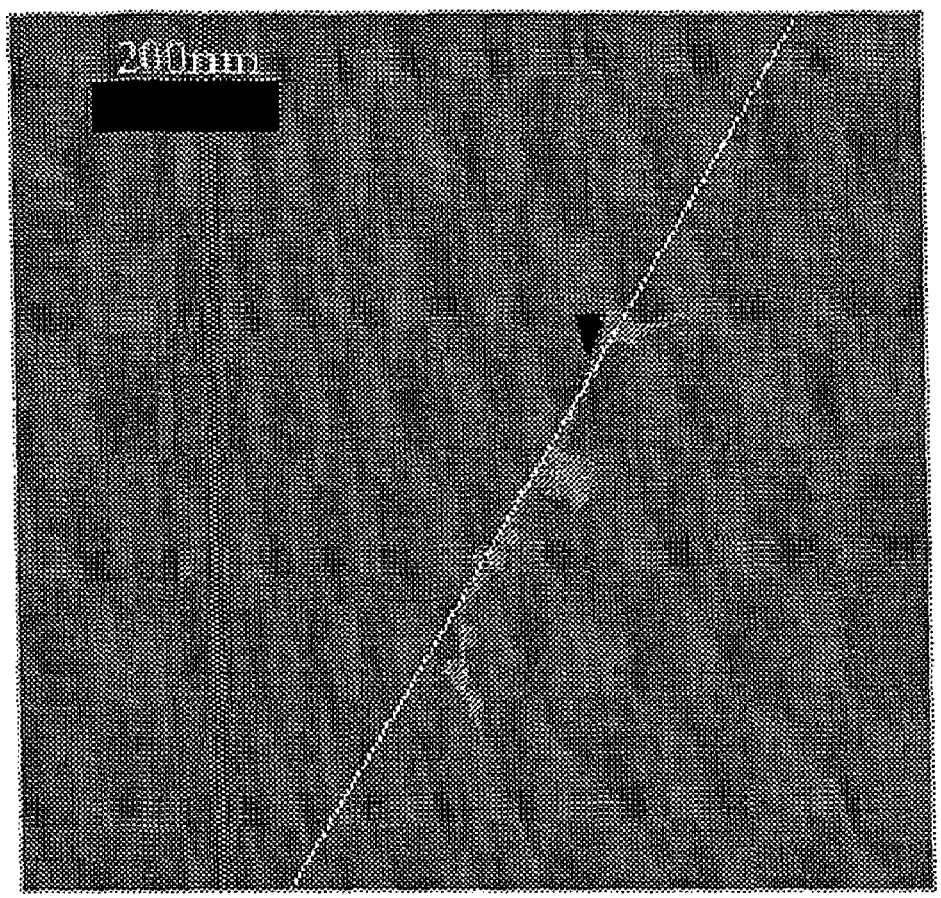
FIG. 11 depicts an AFM image and a height analysis along a backbone of a bundle of hydroxyl-nanotubes 3f, wherein the arrows point to a 0.8 nm height difference due to sidewall functionalization.
Figure 11:
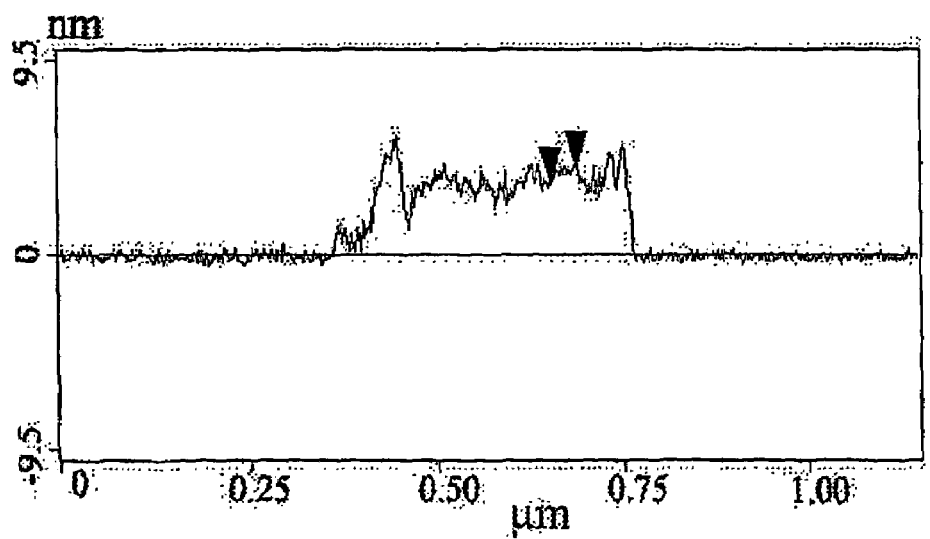

AFM studies of the 3f derivative (FIG. 11) revealed significantly reduced bundle sizes in comparison with the pristine SWNT nanotubes due to sidewall functionalization. The pristine SWNTs are known to aggregate into bundles ranging from several tens to a hundred nanometers in diameter. The average bundle sizes in 3f were measured to be only from 3 to 6 nm in diameter. It is most likely that within those bundles the individual hydroxyl-nanotubes are linked together through hydrogen bonds formed by the terminal OH groups from the side-chains. Tapping mode analysis of the backbone profile of the functionalized SWNT bundles shows an average height of 4.4 nm. The height difference (~0.8 nm) measured along the backbone area, free of amorphous carbon particle impurity, likely relates to the approximate length of the $OCH_2CH(OH)CH_2OH$ chain attached to the nanotube sidewalls in a "stretched" fashion as shown by the TEM image in the inset on FIG. 10.

Example 5

This Example serves to illustrate the improved dispersability or solubility the carbon nanotubes functionalized with hydroxyl-terminated moieties have in polar solvents—compared to unfunctionalized CNTs.

Figure 12:
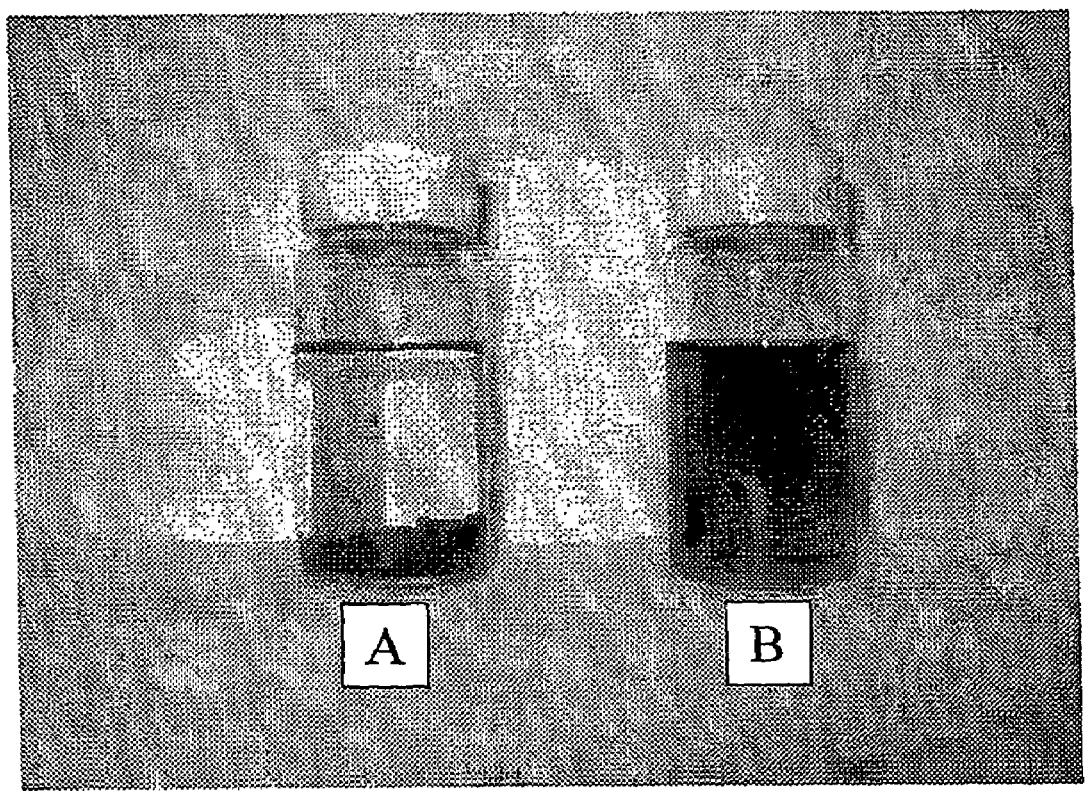
FIG. 12 depicts a photograph of SWNT materials dispersion in ethanol: (A) pristine SWNTs, and (B) glycerol-functionalized SWNTs 3f.

All of the hydroxyl-nanotube SWNT derivatives prepared in Examples 2 and 3 have shown an improved solubility in polar solvents compared with pristine SWNTs (FIG. 12A). The most stable solutions were obtained from the glycerol-derived SWNT material 3f, likely due to their possessing the highest content of hydroxyl groups in the nanotube side chain. The solutions of 3f in water (~40 mg/L) were stable for several days, while ethanol solutions (FIG. 12B) with higher 3f concentration (~80 mg/L) showed little precipitation, even after several months.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
   a) providing a mixture comprising:
      i) fluorinated carbon nanotubes;
      ii) a quantity of metal hydroxide species; and
      iii) a quantity of alcohol species, the alcohol species comprising at least two hydroxyl groups; and
   b) reacting the mixture to yield functionalized carbon nanotubes with hydroxyl-terminated moieties attached to their sidewalls.

2. The method of claim 1, wherein the fluorinated carbon nanotubes are made by a process comprising contacting fluorine with carbon nanotubes selected from the group consisting of single-wall carbon nanotubes, multi-wall carbon nanotubes, double-wall carbon nanotubes, buckytubes, fullerene tubes, tubular fullerenes, graphite fibrils, and combinations thereof.

3. The method of claim 1, wherein the fluorinated carbon nanotubes have a stoichiometry from about $C_1F_{0.01}$ to about $C_2F$.

4. The method of claim 1, wherein the metal hydroxide species is selected from the group consisting of LiOH, NaOH, KOH, and combinations thereof.

5. The method of claim 1, wherein the alcohol species is of the general formula $R(OH)_n$, wherein n is at least two and R is an organic backbone.

6. The method of claim 5, wherein the metal hydroxide species and at least some of the alcohol species are reacted to form a mono-metal salt of the alcohol species, $MOR(OH)_{n-1}$.

7. The method of claim 1, further comprising a step of dispersing the fluorinated carbon nanotubes in a quantity of the alcohol species.

8. The method of claim 1, wherein the step of reacting involves heating.

9. The method of claim 1, wherein the step of reacting involves mixing.

10. The method of claim 1, wherein the step of reacting involves ultrasonication.

11. The method of claim 1, further comprising a step of filtering to collect a filtered product comprising the functionalized carbon nanotubes with hydroxyl-terminated moieties attached to their sidewalls.

12. The method of claim 11, further comprising washing and drying the filtered product.

13. A method comprising the steps of:
a) providing a mixture comprising:
   i) fluorinated carbon nanotubes;
   ii) a quantity of a metal salt of an alcohol species, the alcohol species comprising at least two hydroxyl groups, mixed with the fluorinated carbon nanotubes; and
b) reacting the mixture to yield functionalized carbon nanotubes with hydroxyl-terminated moieties attached to their sidewalls.

14. The method of claim 13, wherein the fluorinated carbon nanotubes are made by a process comprising contacting fluorine with carbon nanotubes selected from the group consisting of single-wall carbon nanotubes, multi-wall carbon nanotubes, double-wall carbon nanotubes, buckytubes, fullerene tubes, tubular fullerenes, graphite fibrils, and combinations thereof.

15. The method of claim 13, wherein the fluorinated carbon nanotubes have a stoichiometry from about $C_1F_{0.01}$ to about $C_2F$.

16. The method of claim 13, wherein the alcohol species is of the general formula $R(OH)_n$, wherein n is at least two and R is an organic backbone.

17. The method of claim 16, wherein the metal salt of the alcohol species is of the general formula $MOR(OH)_{n-1}$.

18. The method of claim 13, further comprising a step of dispersing the fluorinated carbon nanotubes in a quantity of the alcohol species.

19. Functionalized carbon nanotubes made by a process comprising the steps of:
a) providing a mixture comprising:
   i) fluorinated carbon nanotubes, comprising fluorine moieties bonded to the carbon nanotubes;
   ii) a quantity of a metal salt of an alcohol species, the alcohol species comprising at least two hydroxyl groups, mixed with the fluorinated carbon nanotubes; and
b) reacting the mixture to displace a portion of the fluorine moieties to yield functionalized carbon nanotubes;
   wherein the functionalized carbon nanotubes comprise hydroxyl-terminated moieties attached to their sidewalls and residual fluorine moieties.

20. The functionalized carbon nanotubes of claim 19, wherein the fluorinated carbon nanotubes are made by a process comprising contacting fluorine with carbon nanotubes selected from the group consisting of single-wall carbon nanotubes, multi-wall carbon nanotubes, double-wall carbon nanotubes, buckytubes, fullerene tubes, tubular fullerenes, graphite fibrils, and combinations thereof.

21. The functionalized carbon nanotubes of claim 19, wherein the fluorinated carbon nanotubes have a stoichiometry from about $C_1F_{0.01}$ to about $C_2F$.

22. The functionalized carbon nanotubes of claim 19, wherein the alcohol species is of the general formula $R(OH)_n$, wherein n is at least two and R is an organic backbone.

23. The functionalized carbon nanotubes of claim 22, wherein the alcohol species is bis-phenol A.

24. The functionalized carbon nanotubes of claim 22, wherein the metal salt of the alcohol species is of the general formula $MOR(OH)_{n-1}$.

25. The functionalized carbon nanotubes of claim 19, further comprising a step of dispersing the fluorinated carbon nanotubes in a quantity of the alcohol species.

26. The functionalized carbon nanotubes of claim 19, wherein the functionalized carbon nanotubes have a general formula $CNT-[OR(OH)_m]_x$, wherein R is an organic backbone, m is at least one, and x is about 1 to about 500 per 1,000 nanotube carbon atoms.

27. The functionalized carbon nanotubes of claim 19, wherein the functionalized carbon nanotubes are additionally functionalized on their ends.

28. The functionalized carbon nanotubes of claim 23, further comprising a step of reacting the functionalized carbon nanotubes with epichlorohydrin to form carbon nanotubes functionalized on their sidewalls with epoxide-terminated moieties.

29. Functionalized carbon nanotubes comprising:
a) a plurality of carbon nanotubes having functional groups attached to the sidewalls of the carbon nanotubes, wherein:
   i) the functional groups are of the form —$OR(OH)_m$;
   ii) R is an organic backbone; and
   iii) m is at least one; and
b) a quantity of fluorine moieties bonded to the carbon nanotubes.

30. The functionalized carbon nanotubes of claim 29, wherein there are about 1 to about 500 functional groups attached to the sidewalls of the carbon nanotubes per 1,000 nanotube carbon atoms.

31. The functionalized carbon nanotubes of claim 29, wherein the functionalized carbon nanotubes are additionally functionalized on their ends with the functional groups.

32. Functionalized carbon nanotubes comprising a plurality of carbon nanotubes having functional groups comprising epoxide moieties attached to the sidewalls of the carbon nanotubes, wherein:
a) the functional groups are of the form

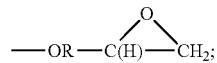

and
b) R is an organic backbone.

33. The functionalized carbon nanotubes of claim 32, wherein there are about 1 to about 500 functional groups attached to the sidewalls of the carbon nanotubes per 1,000 nanotube carbon atoms.

34. The functionalized carbon nanotubes of claim 19, further comprising a step of reacting the functionalized carbon nanotubes with epichlorohydrin to form carbon nanotubes functionalized on their sidewalls with epoxide groups.

35. The functionalized carbon nanotubes of claim 19, wherein an amount of the residual fluorine moieties is about 3 to about 5 atomic percent.

36. The functionalized carbon nanotubes of claim 29, wherein an amount of the residual fluorine moieties is about 3 to about 5 atomic percent.

* * * * *

UNITED STATES PATENT AND TRADEMARK OFFICE
CERTIFICATE OF CORRECTION

PATENT NO. : 7,632,481 B2
APPLICATION NO. : 10/560351
DATED : December 15, 2009
INVENTOR(S) : Khabashesku et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this

Second Day of November, 2010

David J. Kappos
*Director of the United States Patent and Trademark Office*